United States Patent [19]

Fukae

[11] Patent Number: 4,761,789
[45] Date of Patent: Aug. 2, 1988

[54] COOLING METHOD FOR A SLAB-GEOMETRY SOLID STATE LASER MEDIUM AND A LASER DEVICE WHICH EMPLOYS THAT COOLING METHOD

[75] Inventor: Kenneth A. Fukae, Irvine, Calif.

[73] Assignee: Amada Engineering & Service Co., Inc., La Mirada, Calif.

[21] Appl. No.: 891,320

[22] Filed: Jul. 31, 1986

[51] Int. Cl.⁴ ............................................. H01S 3/04
[52] U.S. Cl. ................................. 372/34; 372/98; 372/99; 372/65
[58] Field of Search .................... 372/35, 34, 66, 71, 372/72, 99, 98, 92, 65, 61

[56] References Cited

U.S. PATENT DOCUMENTS

| | | | |
|---|---|---|---|
| 3,609,585 | 9/1971 | Robert | 372/35 |
| 3,679,999 | 7/1972 | Chernoch | 372/35 |
| 4,233,567 | 11/1980 | Chernoch | 372/35 |
| 4,563,763 | 1/1986 | Kuhn | 372/35 |

*Primary Examiner*—Leon Scott, Jr.
*Attorney, Agent, or Firm*—Wigman & Cohen

[57] ABSTRACT

Method and apparatus for cooling a slab-geometry solid state laser medium wherein at least one of the front or rear surfaces of the laser medium is in contact with a glass cover, and a coolant is passed over the outside of the glass cover.

2 Claims, 2 Drawing Sheets

COOLING METHOD FOR A SLAB-GEOMETRY SOLID STATE LASER MEDIUM AND A LASER DEVICE WHICH EMPLOYS THAT COOLING METHOD

BACKGROUND OF THE INVENTION

1. Field of the Invention

This invention relates to a cooling method for a slab-geometry solid state laser medium and laser device which employs that cooling method.

2. Description of the Related Art

Solid state laser media come in two forms, rod and slab-geometry. Rod-geometry solid state laser media are easy to make, but heat from the pumping stage is trapped inside the rod, so that thermally-induced focusing and thermally-induced birefringence occur. In addition, there is the problem that "splitting" of the laser medium occurs.

A slab-geometry solid state laser medium has a larger surface area than a rod-geometry solid state laser medium, so that it dissipates a larger quantity of heat. In addition, in a slab-geometry laser, the laser light advances along a zig-zag path as it is reflected off the upper and lower surfaces of the slab, and as it advances it is amplified. Therefore, even if there is a temperature variation through the thickness of the slab, laser light progresses alternately in opposite directions through a layer of the temperature variation, so that the heat lens effect can be cancelled. Consequently, laser light output from a slab-geometry solid state laser medium has a far superior beam profile to laser light output from a rod-geometry solid state laser medium.

However, even in such a slab-geometry solid state laser medium, when there are temperature variations through the slab in the longitudinal and transverse directions, the beam profile deteriorates. Therefore, it is necessary to make the temperature uniform in both the longitudinal and transverse directions. However since a slab has a very large surface area, it is very difficult to cool it uniformly.

OBJECTS AND SUMMARY OF THE INVENTION

One purpose of this invention is to solve the problem described above, and to provide a method of cooling a slab-geometry solid state laser medium which can uniformly and efficiently cool the front and/or rear surface of the slab, that is, the cooling surfaces of the slab-geometry solid state laser medium.

Another purpose of this invention is to provide a method of cooling a slab-geometry solid state laser medium that makes it possible for the solid state laser medium to output laser light with a high power.

Another purpose of this invention is to provide a method of cooling a slab-geometry solid state laser medium that makes it possible for the solid state laser medium to output laser light with an optimum beam profile.

Another purpose of this invention is to provide a method of cooling a slab-geometry solid state laser medium in which the characteristics of the laser medium do not deteriorate due to the deposit of contaminants contained in the coolant in the laser medium.

Another purpose of this invention is to provide a method of cooling a slab-geometry solid state laser medium in which the values of fluid flow parameters, such as, flow rate of the cooling fluid can be freely selected.

Another purpose of this invention is to provide a method of cooling a slab-geometry solid state laser medium in which the cooling device is very easy to assemble.

Another purpose of this invention is to provide a laser device in which a slab-geometry solid state laser medium can be cooled by the cooling method of the present invention.

Another purpose of this invention is to provide a laser device in which a slab-geometry solid state laser medium is attached to the laser device without mechanical deformation.

In order for the method of cooling a slab-geometry solid state laser medium this invention to achieve the purposes stated above, at least one of the front and rear surfaces of the slab-geometry solid state laser medium is in contact with a cooling cover glass. A coolant flows over the outside of this cooling cover glass.

In addition, the laser device in this invention comprises:

a slab-geometry solid state laser medium, a cooling cover glass in contact with at least one of the front and rear surfaces of this slab-geometry solid state laser medium, a coolant which flows along the cooling cover glass so as to cool it, a pumping means for the purpose of pumping the slab-geometry solid state laser medium, and a light resonator which amplifies the radiated light which is excited inside the said slab geometry solid state laser medium.

These and other objects features and advantages of the present invention will be more apparent from the following description of a preferred embodiment taken in conjunction with the accompanying drawings.

DESCRIPTION OF THE PREFERRED EMBODIMENT

Figure 1:
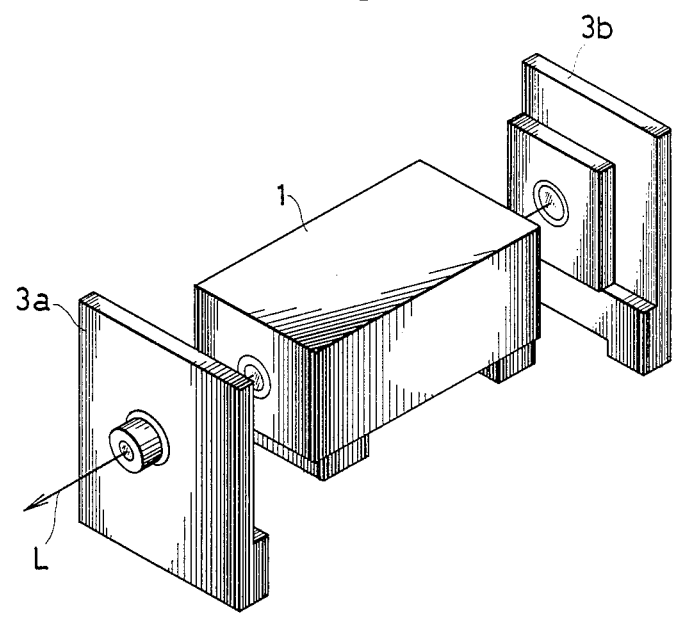
FIG. 1 is a perspective view of a slab-geometry solid state laser device which relates to both a previously existing device and to an embodiment of this invention.

Referring to FIG. 1, a slab-geometry solid state laser device generally consists of a laser device main unit 1 which contains a slab-geometry solid state laser medium and a flash lamp (not shown in FIG. 1), and mirror units 3a and 3b for reflection and feedback of the laser light L output from the main unit 1.

Figure 2:
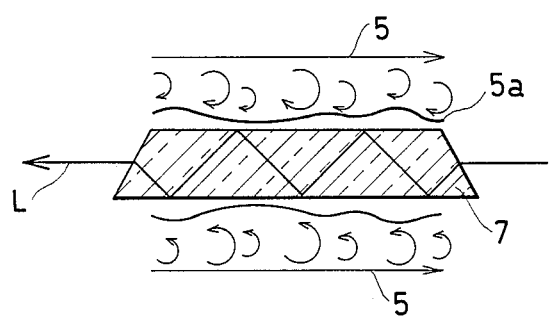
FIG. 2 and FIG. 3 are explanatory diagrams which show a conventional method of cooling a slab-geometry solid state laser medium.

The slab-geometry solid state laser medium contained in this laser device main unit 1 is, as has been described above, heated by the radiant light from the flash lamp, and reaches a very high temperature unless cooled. Therefore, it is necessary to cool this laser medium. At present there are three known methods of cooling, namely:

(1) flowing liquid convection cooling
(2) flowing gas convection cooling
(3) static gas conduction cooling FIG. 2 is an explanatory diagram which illustrates method (1). In this method, a liquid 5, such as water, is used to convectively cool the laser medium 7. This method has the advantage that large amounts of heat can be removed from the crystal 7. The problem with liquid cooling is that the constantly flowing liquid 5 carries contaminants which become deposited on the total internally reflective faces of the laser media 7, leading to out coupling of the laser radiation and locally varying heat exchanging rates. Additionally, flow parameter of the fluid flow 5 must be carefully adjusted so as to provide a thermal boundary layer 5a that should be uniform over the cooling area. As seen in FIG. 2, the thermal boundary layer 5a, determined by the fluid flow boundary layer which arises at the fluid/surface interface, is often not uniform across the crystal face. This leads to locally varying crystal temperatures which, in turn, leads to degraded optical performance. Boundary layer uniformity can be achieved at the cost of increasing the laser head dimensions, and even then, there is no guarantee that the cooling is uniform.

FIG. 2 also shows the second cooling method of the slab geometry laser medium mentioned above. In the second method, cooling gas is forced over the crystal to convectively cool it. In addition to the problem of non-uniform cooling, the heat capacity of the coolant is much less than that of water. Contaminants are also a problem with this type of cooling scheme. Advantages with this type of cooling lie in the fact that sealing requirements are much less severe, thus minimizing mechanical stress due to mounting.

Figure 3:
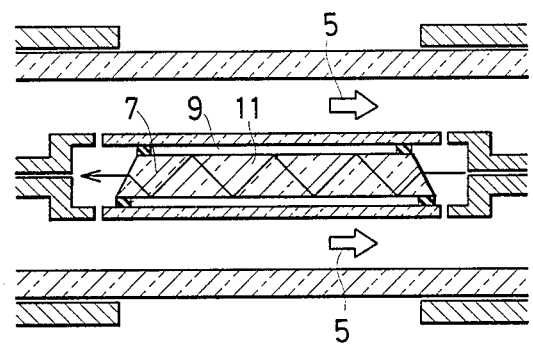

FIG. 3 shows the third cooling method of the slab geometry laser medium. That method uses both convection and conduction cooling. A static gas layer 9 exists between the laser medium 7 and a glass plate 11 that is used to separate the gas 9 from the liquid 5, wherein liquid 5 is used to convectively cool the glass plate. Thus, the gas layer 9 conducts heat from the laser medium 7 to the glass plate 11. The avantage of this method is that local thermal non-uniformities arising at the interface between the liquid 5 and glass plate 11 are not experienced by the laser medium 7 due to the diffusing effect of the static gas layer 9. Contamination of the laser media's reflecting surfaces is also avoided, as well as mounting induced mechanical stress. A major problem with this technique is that, since the thermal conductivity of a gas is generally small, the gas layer limits the heat exchange rate, thus limiting the average power deposited into the laser medium. Additionally, the very thin layer of gas must have its thickness reliably maintained in the presence of high water pressures existing on the other side of the glass plates.

Figure 4:
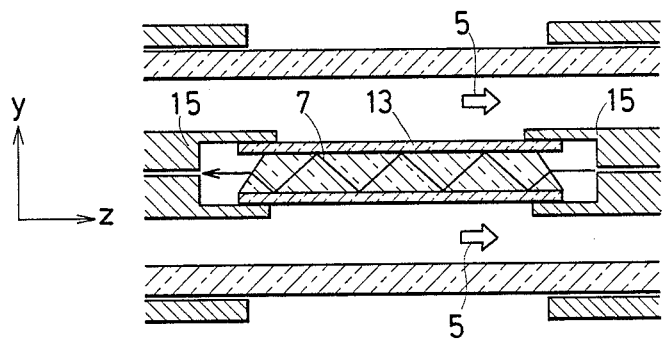
FIG. 4 is an explanatory diagram which shows a method of cooling a slab-geometry solid state laser medium that relates to an embodiment of the present invention.

Now, referring to FIG. 4 and FIG. 5, a preferred an embodiment of this invention will be discussed. In this embodiment, the glass plates 13 are in contact with the front and rear surfaces of the slab-geometry solid state laser medium 7, which are beam reflection surfaces. This laser medium 7 and these glass plates 13 are supported by the support frame 15 through the glass plates 13. Also, a liquid coolant 5 flows along the outer surface of the said glass plates 13 in order to cool the said glass plates 13. The thickness of the glass 13 is chosen to tailor the thermal impedance to the necessary hot diffusion distance between laser crystal 7 and cooling fluid 5. For example, the thicknesses are of order of 1 mm.

Figure 5:
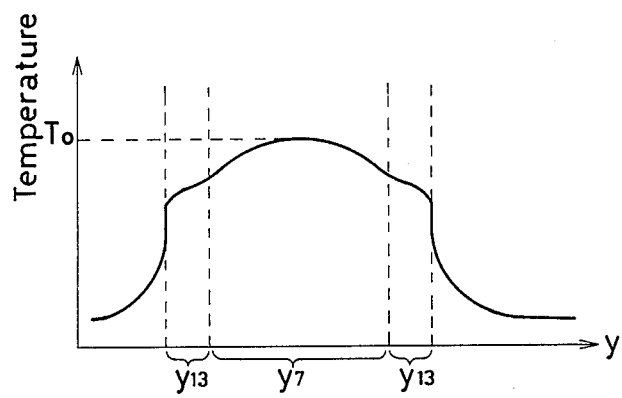
FIG. 5 is a graph which shows the temperature distribution inside the slab-geometry solid state laser medium which is cooled according to method of this invention.

Next, referring to FIG. 5, the effect of this method of cooling will be shown. The glass plates 13 have a much higher thermal conductivity than the gas 9 in the previous example described in FIG. 3. Since the slab-geometry solid state laser medium 7 is cooled by the coolant 5 through the glass plates 13, it is very efficiently cooled. FIG. 5 shows the temperature distribution along the thickness direction (the Y axis in FIG. 4) of the said laser medium 7. Here $Y_7$ and $Y_{13}$ indicate the dimensions across the slab-geometry solid state laser medium 7 and the cooling plates 13, respectively.

In addition, as a second effect, even if a nonuniformity of temperature occurs along a boundary surface between the coolant 5 and a glass plate 13, the glass plates 13 eliminates the nonuniformity in temperature, so that a nonuniformity in temperature does not occur on the front and rear surfaces of the slab-geometry solid state laser medium 7.

It is not necessary for the glass plates 13 to cover all of the front and rear surfaces of the slab-geometry solid state laser medium 7. They only need to cover the parts that really need to be cooled.

Also, this technique can only be used for crystal substrate laser media such as YAG, GGG, and GSGG. It cannot work for glass substrates because the index of refraction will be nearly matched to the glass plate.

Although the invention has been described in its preferred embodiments, it is to be understood that various changes and modifications may be made within the purview of the appended claims without departing from the true scope and spirit of the invention in its broader aspects.

What is claimed is:

1. A laser device comprising:
    a support frame;
    a slab-geometry solid state crystal laser medium having parallel top and bottom surfaces supported by the support frame, and front and rear surfaces;
    a pumping means for pumping the slab-geometry solid state crystal laser medium at least through one of said top and bottom surfaces;
    means for cooling said laser medium through said top and bottom surfaces, wherein said cooling means includes:
    a first and second cooling glass cover supporting said top and bottom surfaces, respectively, of the laser medium and containing said front and rear surfaces therebetween; and
    a coolant fluid in contact with said cooling glass covers and flowing along the glass covers for carrying away heat from the glass covers;
    the improvement wherein: said first and second glass-covers are in contact with said top and bottom surfaces, respectively, of the crystal laser medium so as to attach the laser medium to the laser device without mechanical deformation of said glass covers and to prevent a nonuniformity of temperature on said front and rear surfaces of the laser medium.

2. A laser device of claim 1, wherein said cooling glass cover has a thickness of about 1 mm.

* * * * *